A. W. LIMONT.
METHOD OF MAKING PROJECTILE BANDS.
APPLICATION FILED FEB. 20, 1917.

1,274,359.

Patented July 30, 1918.
4 SHEETS—SHEET 1.

Inventor.
Alexander W. Limont
by Henry B. Rickards
His Attorney.

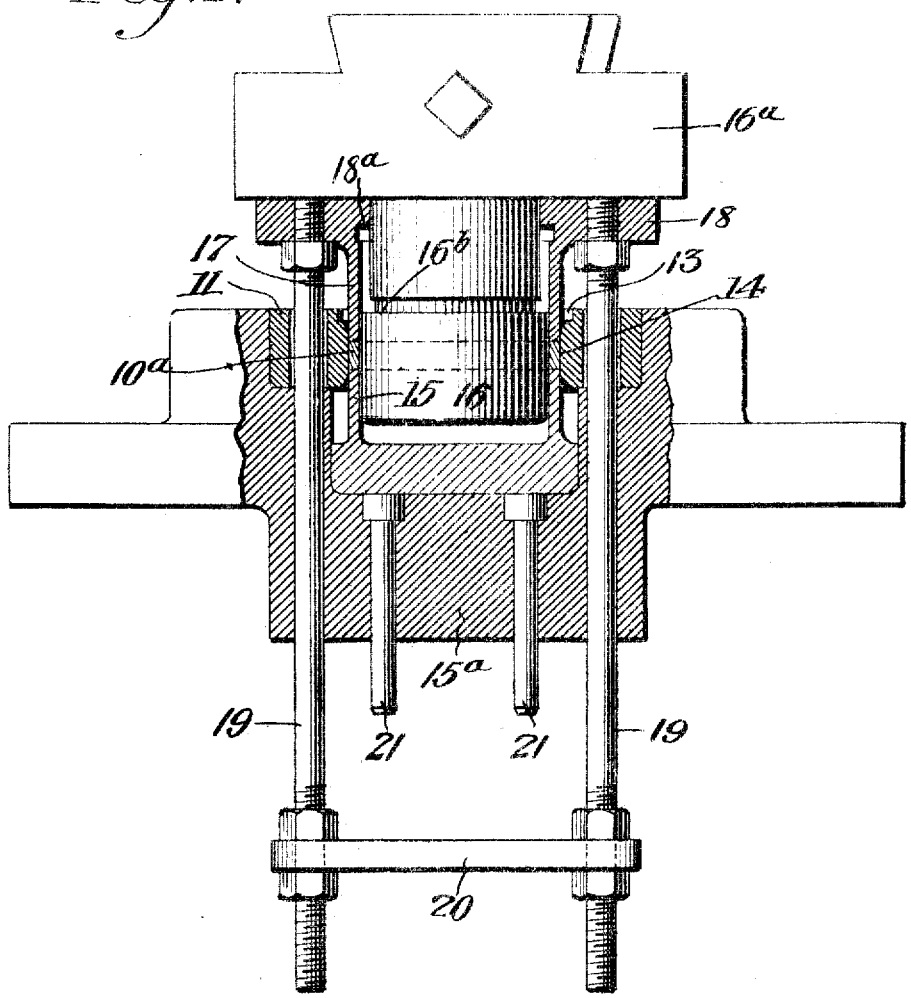

A. W. LIMONT.
METHOD OF MAKING PROJECTILE BANDS.
APPLICATION FILED FEB. 20, 1917.
1,274,359.
Patented July 30, 1918.
4 SHEETS—SHEET 3.
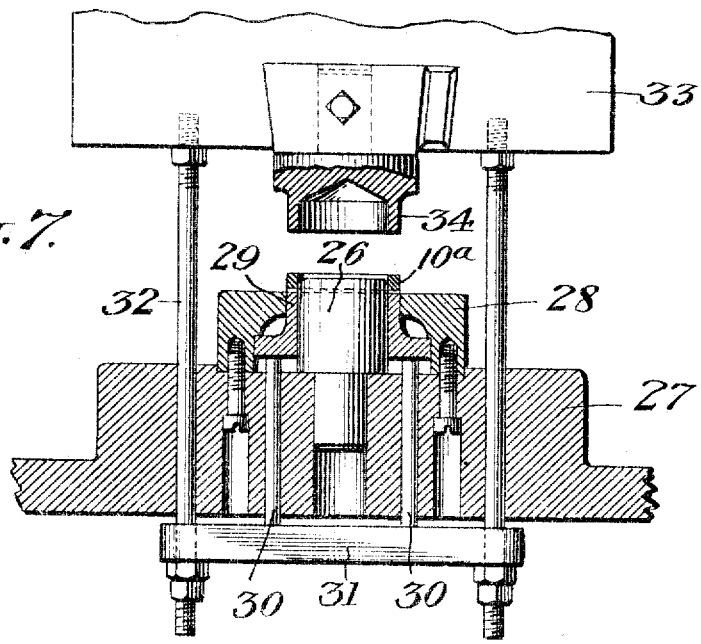
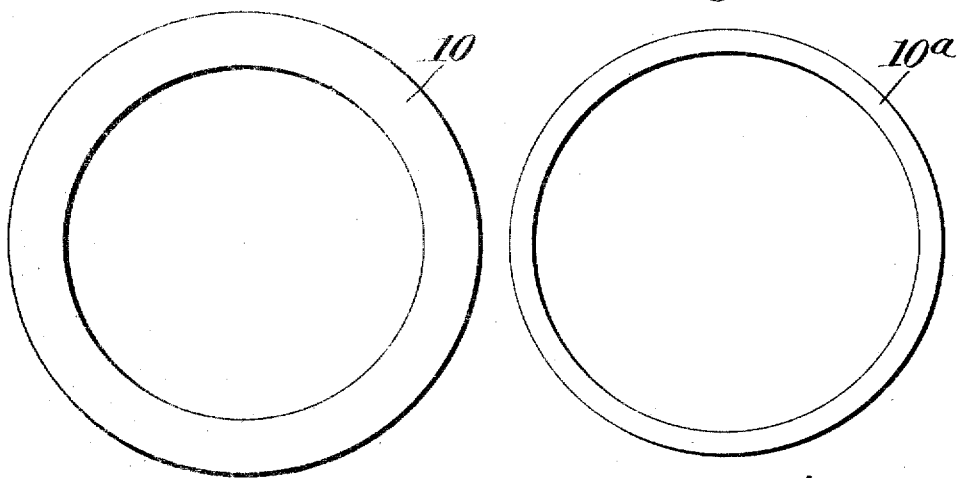
Inventor.
Alexander W. Limont
by [signature]
his attorney.

UNITED STATES PATENT OFFICE.

ALEXANDER W. LIMONT, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

METHOD OF MAKING PROJECTILE-BANDS.

1,274,359.  Specification of Letters Patent.  Patented July 30, 1918.

Original application filed November 5, 1915, Serial No. 59,840. Divided and this application filed February 20, 1917. Serial No. 149,875.

*To all whom it may concern:*

Be it known that I, ALEXANDER W. LIMONT, a citizen of the United States, residing in Bridgeport, county of Fairfield, and State of Connecticut, have invented certain new and useful Improvements in Methods of Making Projectile-Bands, of which the following is a full, clear, and exact description.

This invention relates to a new method for manufacture of copper or other metallic bands for projectiles, such as shrapnel. This application is a division of my application, Serial No. 59,840, filed November 5th, 1915.

In making projectile bands, the practice now followed is to draw a seamless tube to the proper size from a solid billet or a cast tubular shell, and then to place the tube in a suitable cutting off machine which cuts rings or bands therefrom, one or more at a time.

One of the primary objects of the present invention is to provide a method which is much more simple, accurate and economical than that just mentioned.

A further object of the invention is to furnish a new method whereby rings or bands of the required dimensions can be formed very quickly and accurately in large quantities by a series of very simple operations.

To these and other ends, the invention consists in the novel steps and procedure to be hereinafter described and claimed.

In the accompanying drawing.

Fig. 2 is a similar view, showing a later stage of the operation;

Fig. 3 is an enlarged detail view of the blank;

Fig. 4 is a similar view of the band;

Fig. 7 is a sectional elevation on a smaller scale of a press for performing an operation subsequent to that shown in Figs. 5 and 6.

Figure 1:
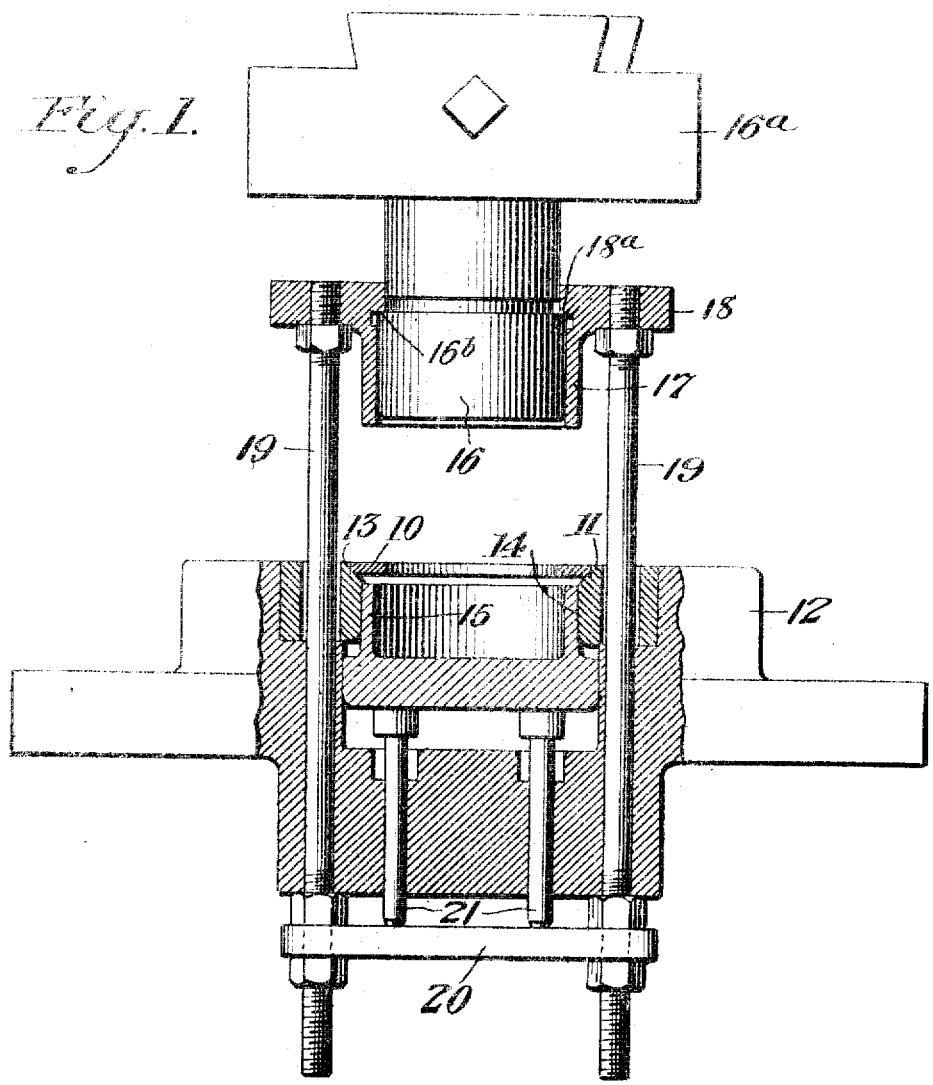
Figure 1 is a fragmentary elevation, partly in section, of a press used in carrying out my new method, showing the commencement of the operation.

Referring to the drawing, and more particularly to Figs. 1-4 inclusive, I use a blank 10 (Fig. 3) which is in the form of a washer of suitable size cut out of a flat strip or sheet of copper or like ductile material of suitable gage. The blank 10 is then placed in a press, such as shown in Figs. 1 and 2, in which it is drawn to form the band, and the band is given the required internal and external diameter. In the form shown, the press is constructed as follows: A drawing die 11, mounted in a suitable bed plate 12, is provided with a cylindrical mouth portion 13 to receive the washer 10, and below the cylindrical mouth portion 13, the die is provided with a cylindrical wall 14 of less diameter, the portions 13 and 14 being joined by an easy curve or fillet. Guided vertically in the die opening is a cylindrical sizing sleeve 15, whose external diameter corresponds to that of the finished band, and whose internal diameter likewise corresponds to that of the finished band. The outer surface of this sleeve 15 is adapted to slide in close contact with the surface 14. Above the die 11 is a cylindrical drawing punch 16 mounted on a suitable cross head or gate 16ª on the press. The external diameter of this drawing punch corresponds to the internal diameter of the finished band, and it is adapted to draw the blank 10 in the recess 13, and to then enter the sleeve 15. Surrounding the drawing punch 16 is a second sizing sleeve 17 corresponding to the sleeve 15. In the form shown, this sleeve 17 is formed integral with a cross head 18, mounted on rods 19 which support the sizing sleeve 15 by means of the plate 20 and lifter pins 21. At a suitable point in the downward travel of the punch 16, the cross head 18 and sleeve 17 are depressed by the abutment of the cross head 16ª against the cross head 18 which causes the sizing sleeve 15 to descend in the drawing die.

When the blank 10 has been placed in the drawing die in the manner shown in Fig. 1, the gate 16ª of the press is caused to descend, and the punch 16 engages the inner part of the blank and displaces the metal in such inner portion in an outward direction and draws the blank down against the surface 14 so as to form it into a band 10ª, as shown in Fig. 2. This roughly formed band has its inner and outer surfaces substantially parallel to each other throughout the axial section of the band, and the edges of the band are substantially flat and at right angles to the inner and outer surfaces. After the band has been formed to its approximate final shape in the drawing die by the punch, it is subjected to pressure to perfect the same, and bring both the internal and external dimensions accurately to the required size. This is effected by the sizing sleeves 15, 17, as shown more particularly in Fig. 2. Before the press gate reaches the limit of its downward movement, the internal surface of the band is supported against the punch, the external surface is supported against the surface 14 of the die and the bottom surface rests on the upper edge of the sleeve 15, which sleeve in this position of the parts is rigidly supported from the bottom by a portion 15ª of the bed plate. The upper edge of the band is contacted by the lower edge of the sizing sleeve 17, and as said sleeve is now subjected to heavy downward pressure, the band is highly compressed and caused to completely fill the space between the punch and die. During this operation, the punch acts as a sort of mandrel for the blank. In this manner, the band can be very accurately made as regards both internal and external diameter which, of course, is a matter of great importance.

On the upstroke of the press, the punch 16 carries upward the cross head 18 and sleeve 17, by engagement of a shoulder 16ᵇ on the punch with a shoulder 18ª on the cross head, and the sleeve 15 is raised by the lifter pins 21, so as to eject the finished band from the die in an obvious manner.

Figure 5:
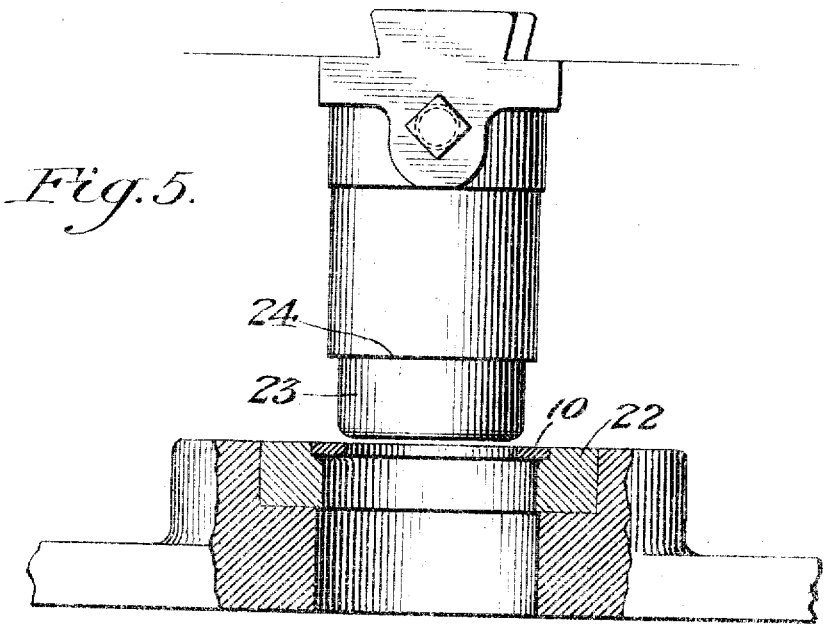
Figs. 5 and 6 are sectional elevations of another type of press which can be used.
Figure 6:
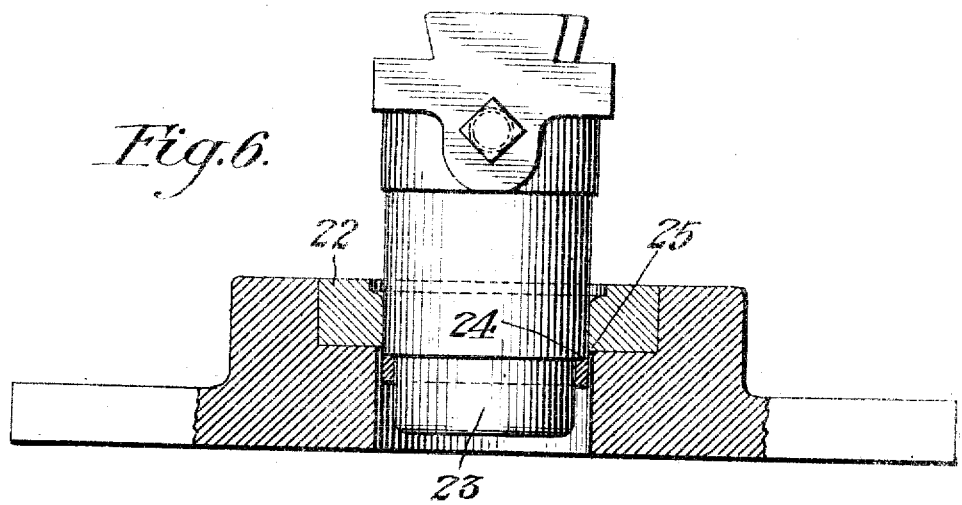

In Figs. 5, 6 and 7, I show another apparatus for carrying out the improved method. This apparatus comprises two sets of dies, one for drawing the blank, and the other for sizing the same. In Fig. 5, the washer 10 is drawn in a die 22 by means of a punch 23 having a shoulder 24. As the punch descends, the blank is drawn by the reduced lower end of the punch and takes up against the shoulder 24. On the upstroke of the punch, the band is stripped from the latter by the lower edge 25 of the die. The stripping of the band by the die 22 is due to the fact that when the pressure upon the outer surface of the band is removed, the band expands slightly, thus preventing it from passing through the die 22 as the punch 23 moves upward. The blank then falls out of the die, through the bottom thereof, and is placed in another press of the type shown in Fig. 7. This press has a fixed sizing punch or mandrel 26 on the bed plate 27, and around the punch 26 is a die 28. The internal diameter of the die opening corresponds to the external diameter of the finished band, and the external diameter of the punch 26 corresponds to the internal diameter of the finished band. A sizing sleeve 29 is adapted to slide up and down between the punch 26 and die 28, being mounted on rods 30 supported by a plate 31, which plate 31 is in turn supported by rods 32 from the gate 33 of the press. Another sizing sleeve 34 carried by the gate 33 is adapted to enter the space between the punch 26 and die 28 when the gate is lowered. The roughly finished blank is placed around the punch 26, as shown at 10ª, and on the first part of the downward movement of the press, the plate 31 is lowered so as to let the sizing sleeve 29 down on the support 27, and thereby permit the blank 10ª to move down into the die 28, where it is compressed between said die and the punch and the two sizing sleeves in substantially the same manner hereinbefore described, so as to perfect it in shape and bring it to the required dimensions.

It will be observed that in both of the methods herein described for drawing the band from a flat washer-like shape into a cylindrical shape, the blank is drawn continuously from the first mentioned shape to the second through an intermediate conical shape by the application of pressure which acts always from the same side of the blank or cone. There is, therefore, no necessity of inverting the blank in the die, or otherwise shifting it at an intermediate stage of the drawing operation, said operation being, in fact, practically instantaneous. The copper or other soft metal used is of such a ductile character that, obviously, this operation can be readily carried out while the blank is in a cold state. I use the terms "conical" and "cone" in a broad sense, as the intermediate shape may be only approximately conical.

It will also be observed that in the preferred practice of the invention, as shown in the drawings, the washer-like blank is of appreciable thickness. It will be noticed from Fig. 1, for example, that, in the specific method illustrated, the maximum diameter of the washer-like blank is only twenty-four times, approximately, the thickness of the metal, although various changes may be made in the dimensions without departing from the broad principles of the invention. As shown in the drawings, the radial distance between the inner and outer peripheries of the washer is only three times, approximately the thickness or gage of the metal, although in this respect also considerable variation is possible without departure from the broad aspects of the invention.

I do not claim herein the apparatus used in carrying out the improved method, which is claimed in my applications Serial Nos.

59,840 and 212,470, nor do I claim herein the specific method of making a projectile band or the like which comprises drawing a washer through a die, as claimed in the last mentioned application.

It will be apparent that I do not limit myself to the employment of a washer in which the upper and lower surfaces are exactly parallel to each other. While the washer is of considerable thickness i. e. not of negligible thickness, the thickness is shown as being less than the width of the annular portion, in the approximate proportions previously stated.

I do not claim herein the specific method of sizing the band which comprises interposing the same between a suitable mandrel and a surrounding die, exerting pressure on the upper and lower edges of the band to cause it to fill the space between the mandrel and die, and then exerting pressure on the band from beneath to eject it from the die, as claimed in my application, Serial No. 242401.

Various changes in the method herein described may be made without departing from the scope of the invention as defined in the claims.

What I claim is:

1. The method of making a projectile band, which comprises drawing a flat washer of relatively soft, ductile metal into cylindrical shape through a conical form by the application of pressure at one side only of the cone.

2. The method of making a projectile band, which comprises continuously drawing a flat, readily ductile washer while in a cold state into cylindrical form by the application of pressure at one and the same side of the blank.

3. The method of making a projectile band or the like, which comprises drawing a washer-like blank of ductile metal in a suitable die into a conical shape by means of a punching instrumentality, and continuing the drawing action of said instrumentality from the larger end of the conical blank, while the latter remains in the die, until the blank assumes a cylindrical shape.

4. The method of making a projectile band or the like, which comprises placing a flat washer-like blank in a die, and drawing the blank by a punching instrumentality descending into the blank and die, which instrumentality in the first part of its downward movement draws the blank into conical shape and then, as the downward movement is continued, draws the conical blank into a cylinder.

5. The method of making a projectile band or the like, which comprises forming a flat washer-like blank of ductile metal in which the radial distance between the inner and outer peripheries is approximately three times the thickness of the metal, and drawing such washer through a conical shape to a cylindrical shape by the application of pressure from one side only of the blank.

6. The method of making a projectile band or the like, which comprises forming a flat washer-like blank of ductile metal, the maximum diameter of which is approximately twenty-four times the thickness of the stock, and drawing such washer continuously to a cylindrical form through a conical form.

7. The method of making a projectile band or the like, which comprises drawing a flat washer in a cylindrical die into cylindrical shape through a conical shape by the continuous application of pressure from one side only of the blank, and then exerting pressure on opposite edges of the roughly finished band while said band remains in the same die in which it is so continuously drawn, for perfecting the band and bringing it accurately to size.

8. The method of making a projectile band or the like, which comprises forming a flat washer-like blank of ductile metal, the thickness of which approximates one-twenty-fourth of the maximum diameter, and one-third of the radial distance between the inner and outer peripheries, and then punching such washer in a die from the same side of the washer until the latter assumes a cylindrical shape.

9. The method of making a projectile band or the like, which comprises cutting a flat, washer-like blank of ductile metal, placing said blank in a die, and drawing said blank continuously while in a cold state through a conical shape to a cylindrical shape by the application of pressure at one side only of the blank, directed from the larger end of the cone.

10. A method of making metal bands, characterized by the cold punching of a flat ductile metal washer of considerable thickness from the same side of the washer until the latter presents a cylindrical shape.

In witness whereof, I have hereunto set my hand on the 17 day of Feb., 1917.

ALEXANDER W. LIMONT.